United States Patent [19]
Kaiser

[11] Patent Number: 6,046,445
[45] Date of Patent: Apr. 4, 2000

[54] SOLAR POWERED LASER RECEIVER CIRCUIT

[75] Inventor: Timothy David Kaiser, Beavercreek, Ohio

[73] Assignee: Spectra Precision, Inc., Dayton, Ohio

[21] Appl. No.: 09/060,677

[22] Filed: Apr. 15, 1998

[51] Int. Cl.[7] ................................................ H01S 40/14
[52] U.S. Cl. .................................. 250/208.2; 250/214 A
[58] Field of Search .......................... 250/208.2, 208.3, 250/208.4, 208.5, 214 R, 214 A, 214 CS; 356/138, 139.1, 141.1, 141.2, 141.3, 141.4, 152.1, 152.2, 152.3, 248, 247; 33/285, 286

[56] References Cited

U.S. PATENT DOCUMENTS

| | | | |
|---|---|---|---|
| 4,029,415 | 6/1977 | Johnson | 33/286 |
| 4,676,634 | 6/1987 | Peterson | 356/4 |
| 4,693,598 | 9/1987 | Sehr | 356/4 |
| 4,820,041 | 4/1989 | Davidson et al. | 356/3.12 |
| 4,907,874 | 3/1990 | Ake | 356/4 |
| 5,000,564 | 3/1991 | Ake | 356/3.16 |
| 5,033,847 | 7/1991 | Hamblin et al. | 356/138 |
| 5,189,484 | 2/1993 | Koschmann et al. | 356/138 |
| 5,481,104 | 1/1996 | Miller et al. | 250/214 C |
| 5,636,018 | 6/1997 | Hirano et al. | 356/248 |

OTHER PUBLICATIONS

Declaration of Timothy David Kaiser (Jul. 13, 1998).

*Primary Examiner*—John R. Lee
*Attorney, Agent, or Firm*—Killworth, Gottman, Hagan & Schaeff, L.L.P.

[57] ABSTRACT

A light detection system is provided including a switching circuit connected to an inductor shunted across a photoelectric cell and operative to switch between a light detection state and a charge storage state, wherein the light detection state causes a majority of current flowing through the inductor to bypass the charge storage circuit, and wherein the charge storage state causes a majority of current flowing through the inductor to pass through the charge storage circuit. In one embodiment of the present invention, the switching circuit is changed to the light detection state during a first period of time during which the laser beam is in the vicinity of the photoelectric cell and to the charge storage state during a second period of time during which the laser beam is remote from the photoelectric cell.

25 Claims, 4 Drawing Sheets

SOLAR POWERED LASER RECEIVER CIRCUIT

BACKGROUND OF THE INVENTION

The present invention relates to equipment of the type used in surveying and construction, and, more particularly, to a detector device for such an application which detects the position or level of a reference plane defined by a rotating laser beam.

Rotating laser beams are commonly used in the fields of civil engineering, construction, agriculture, and surveying to establish a reference plane of light. U.S. Pat. No. 5,033,847, issued Jul. 23,1991, the disclosure of which is incorporated herein by reference, illustrates a laser transmitter which provides such a rotating reference beam. A variety of detection schemes are utilized to provide an indication of the position or orientation of a reference plane of light. For example, U.S. Pat. No. 4,676,634, issued to Peterson on Jun. 30, 1987, U.S. Pat. No. 4,693,598, issued to Sehr on Sep. 15, 1987, and U.S. Pat. No. 4,907,874, issued to Ake on Mar. 13,1990, the disclosures of which are incorporated herein by reference, each teach this type of laser detection device. These types of detection devices are typically battery-powered, particularly when employed in applications where conventional electric power lines are not readily available. Thus, battery life is an important factor affecting the utility of the device and the efficiency of those utilizing the device. Accordingly, there is a need for a battery-operated light detection device that maximizes the life of the battery power supply without unduly compromising its light detection operations.

BRIEF SUMMARY OF THE INVENTION

This need is met by the present invention wherein a light detection system is provided including a switching circuit connected to an inductor shunted across a photoelectric cell. The switching circuit is operative to switch between a light detection state and a charge storage state, wherein the light detection state causes a majority of current flowing through the inductor to bypass the charge storage circuit, and wherein the charge storage state causes a majority of current flowing through the inductor to pass through the charge storage circuit. In one embodiment of the present invention, the switching circuit is changed to the light detection state during a first period of time during which the laser beam is in the vicinity of the photoelectric cell and to the charge storage state during a second period of time during which the laser beam is remote from the photoelectric cell.

In accordance with one embodiment of the present invention, a light receiver circuit is provided comprising a photoelectric cell, a signal amplifier, a controller, an inductor, a charge storage circuit, and a switching circuit. The photoelectric cell defines a photoelectric cell output terminal and is arranged to produce an incident light current signal in response to light incident upon the photoelectric cell. The signal amplifier is connected to the photoelectric cell output terminal and is arranged to produce an amplified incident light signal. The controller is connected to the signal amplifier and is arranged to provide an output indicative of at least one characteristic of the incident light. The inductor defines an inductor input terminal and an inductor output terminal, wherein the inductor input terminal is connected to the photoelectric cell output terminal. The charge storage circuit is connected to the inductor output terminal. The switching circuit is connected to the inductor output terminal and is operative to switch between a light detection state and a charge storage state, wherein the light detection state causes a majority of current flowing through the inductor to bypass the charge storage circuit, and wherein the charge storage state causes a majority of current flowing through the inductor to pass through the charge storage circuit. The light detection state may be characterized by connection of the inductor output terminal to a first electrical potential lower than a potential generated by the incident light current signal. The first electrical potential may comprise an electrical ground.

The controller may comprise a switching circuit controller programmed such that the charge storage state comprises: (i) a first mode characterized by isolation of the inductor output terminal from a first electrical potential for a first duration, wherein the first electrical potential is lower than a potential generated by the incident light current signal; and (ii) a second mode characterized by connection of the inductor output terminal to the first electrical potential for a second duration. The switching circuit controller may be programmed such that the charge storage state is characterized by alternation between the first mode and the second mode. The first duration and the second duration may collectively form an alternation period characterized by a frequency of about 100 kHz. The first duration may correspond to a predetermined optimum charge time of a charging capacitor within the charge storage circuit and the second duration may corresponds to a predetermined optimum discharge time of the charging capacitor.

The controller may comprise a switching circuit controller programmed to cause current to bypass intermittently the charge storage circuit as a function of a predetermined alternation period frequency. Alternatively, the charge storage circuit may comprise a charging capacitor and the controller may comprise a switching circuit controller programmed to cause current to bypass intermittently the charge storage circuit as a function of the amount of electrical charge stored in the charging capacitor.

The controller may include a signal processor arranged to provide an output indicative of a position of a laser beam relative to the photoelectric cell. The controller may be programmed to identify a sweep rate of a laser beam incident upon the photoelectric cell. The sweep rate may define a first period of time during which the laser beam is in the vicinity of the photoelectric cell and a second period of time during which the laser beam is remote from the photoelectric cell and the controller may be further programmed to change the state of the switching circuit as a function of the first and second periods of time. Preferably, the switching circuit is changed to the light detection state during the first, period of time and to the charge storage state during the second period of time.

The controller may comprise a signal processor and a switching circuit controller. The switching circuit may comprise a MOSFET device and the photoelectric cell may comprise a photodiode. The signal amplifier may comprise a frequency filter capacitor coupled to the input of an amplifier operative to convert selected frequency current signals produced by the photoelectric cell to a voltage signal and to amplify the voltage signal. The frequency filter capacitor may have a capacitance of approximately 1 $\mu$F. The inductor may comprise an electrical coil, may be connected in parallel with the photoelectric cell, and may have an inductance of between approximately 0.1 mH and approximately 10 mH. The charge storage circuit may comprises a blocking diode, a charging capacitor, a voltage regulator, and a rechargeable power supply.

In accordance with another embodiment of the present invention a laser receiver is provided comprising: a plurality of photoelectric cells, respective signal amplifiers, a controller, a plurality of inductors, a charge storage circuit, and a switching circuit. The plurality of photoelectric cells define respective photoelectric cell output terminals and are arranged to produce respective incident laser beam signals in response to a laser beam incident upon the plurality of photoelectric cells. The respective signal amplifiers are connected to each of the photoelectric cell output terminals and are arranged to produce respective amplified incident laser beam signals. The controller is connected to the respective signal amplifiers and is arranged to provide an output indicative of at least one characteristic of the incident laser beam. The plurality of inductors define respective inductor input terminals and respective inductor output terminals, wherein each of the inductor input terminals is connected to one of the photoelectric cell output terminals. The charge storage circuit is connected to the inductor output terminals. The switching circuit is connected to the inductor output terminals and is operative to switch between a light detection state and a charge storage state, wherein the light detection state causes a majority of current flowing through each of the plurality of inductors to bypass the charge storage circuit, and wherein the charge storage state causes a majority of current flowing through each of the plurality of inductors to pass through the charge storage circuit. The plurality of photoelectric cells are preferably arranged in an ordered array and the controller is preferably arranged to provide an output indicative of a position of the laser beam relative to the plurality of photoelectric cells.

In accordance with yet another embodiment of the present invention, a method of powering a light receiver circuit is provided comprising the steps of: providing a photoelectric cell defining a photoelectric cell output terminal, the photoelectric cell being arranged to produce an incident light current signal in response to light incident upon the photoelectric cell; connecting a signal amplifier to the photoelectric cell output terminal, the signal amplifier being arranged to produce an amplified incident light signal; connecting a controller to the signal amplifier, the controller being arranged to provide an output indicative of at least one characteristic of the incident light; providing an inductor defining an inductor input terminal and an inductor output terminal; connecting the inductor input terminal to the photoelectric cell output terminal; connecting a charge storage circuit to the inductor output terminal; switching a switching circuit between a light detection state which causes a majority of current flowing through the inductor to bypass the charge storage circuit, and a charge storage state which causes a majority of current flowing through the inductor to pass through the charge storage circuit.

Preferably, upon switching the switching circuit to the charge storage state, the method further comprises the steps of: operating in a first mode characterized by isolation of the inductor output terminal from a first electrical potential for a first duration, wherein the first electrical potential is lower than a potential generated by the incident light current signal; operating in a second mode characterized by connection of the inductor output terminal to the first electrical potential for a second duration; and alternating between the first mode and the second mode such that the first duration and the second duration collectively form an alternation period.

The method may further comprise the steps of: identifying a sweep rate of a laser beam incident upon the photoelectric cell, wherein the sweep rate defines a first period of time during which the laser beam is in the vicinity of the photoelectric cell and a second period of time during which the laser beam is remote from the photoelectric cell; and, changing the state of the switching circuit to the light detection state during the first period of time and to the charge storage state during the second period of time.

Accordingly, it is an object of the present invention to provide a laser receiver that utilizes a single set of photoelectric cells to convert ambient solar energy to a recharging current and to convert an incident reference laser beam to a detection signal. It is a further object of the present invention to provide a laser receiver designed so that the recharging function does not interfere with the detection function. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
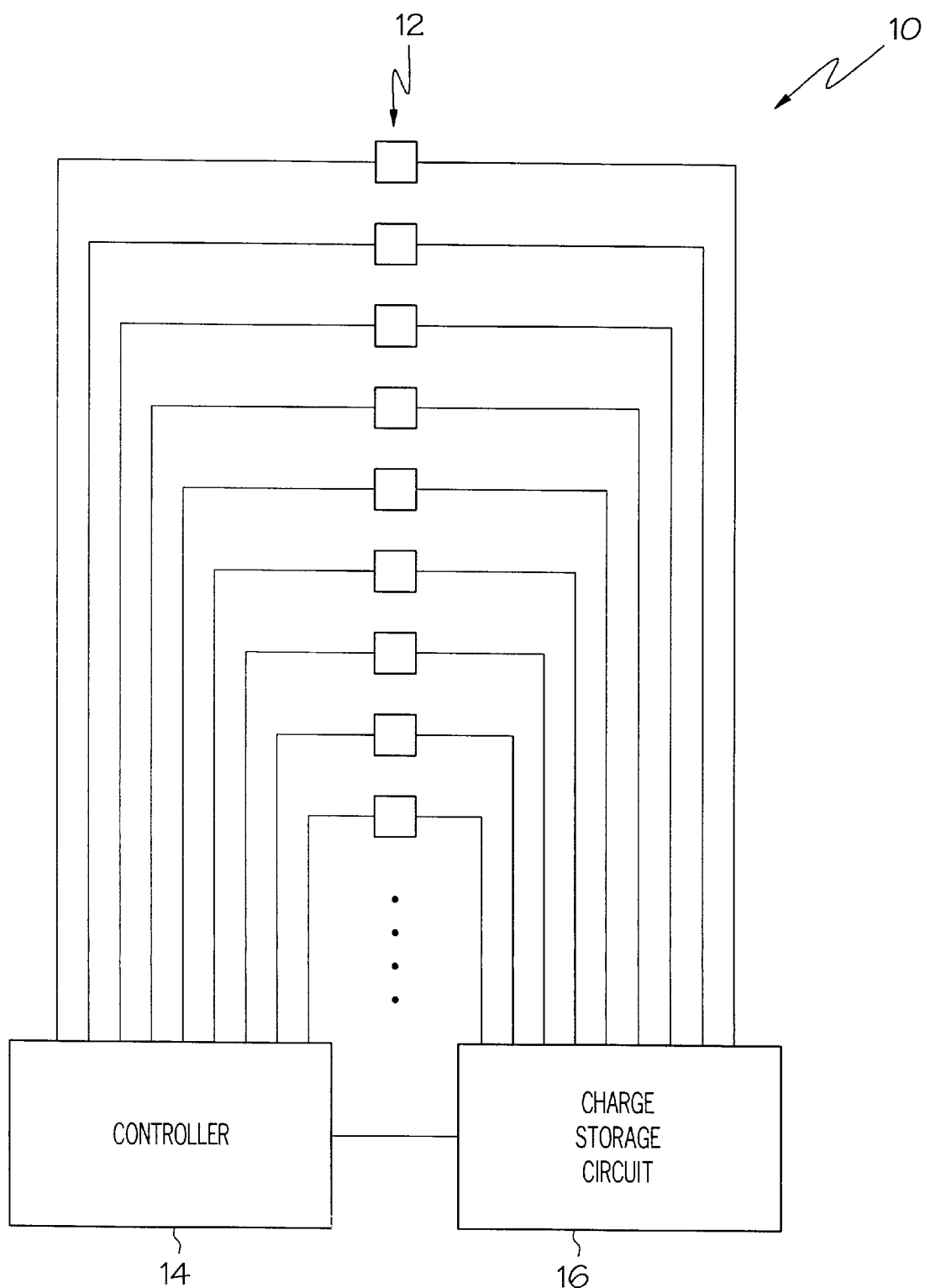
FIG. 1 is a schematic overview of a laser receiver of the present invention.
Figure 2:
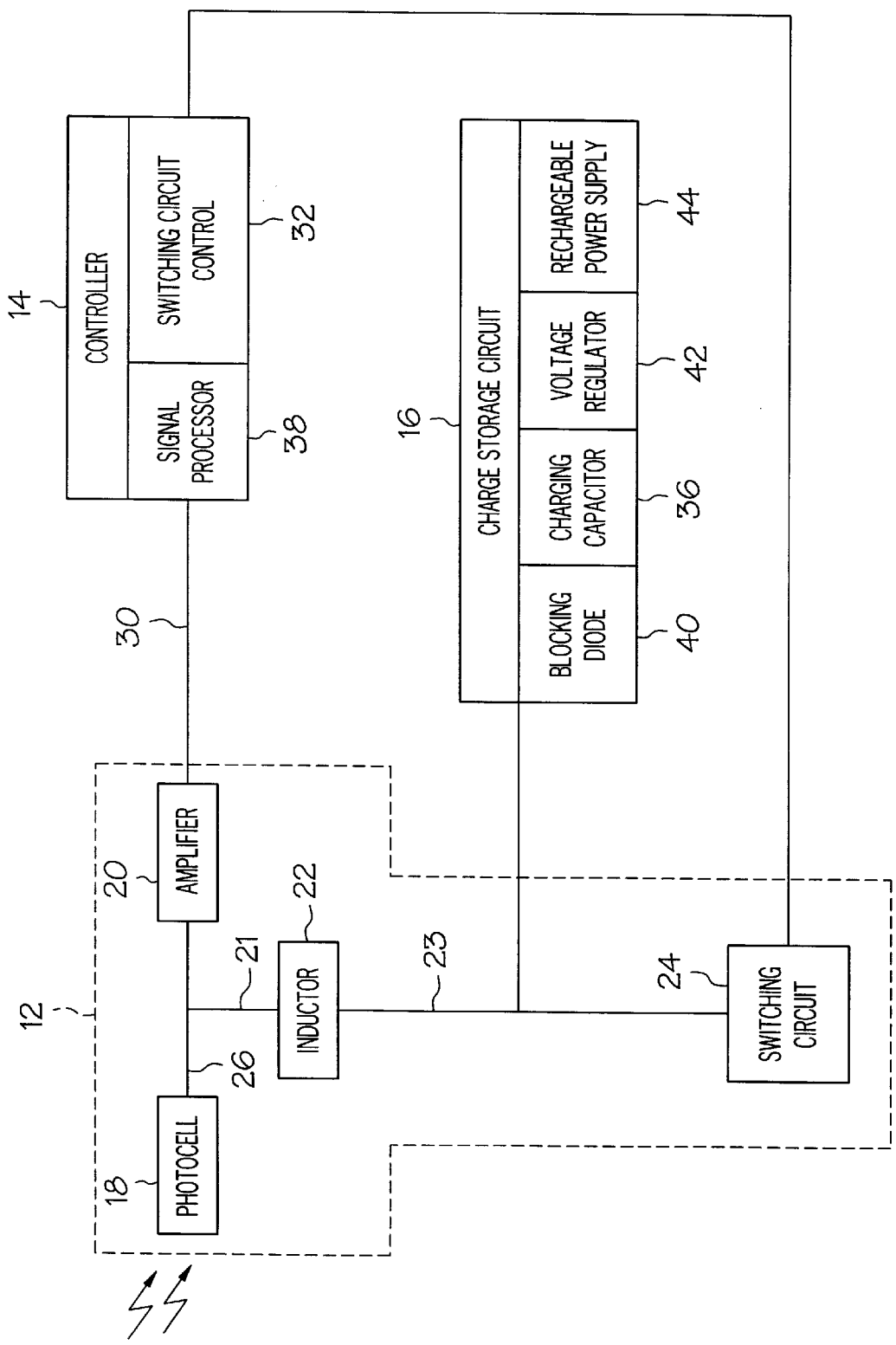
FIG. 2 is a detailed block diagram of a laser receiver of the present invention.
Figure 3:
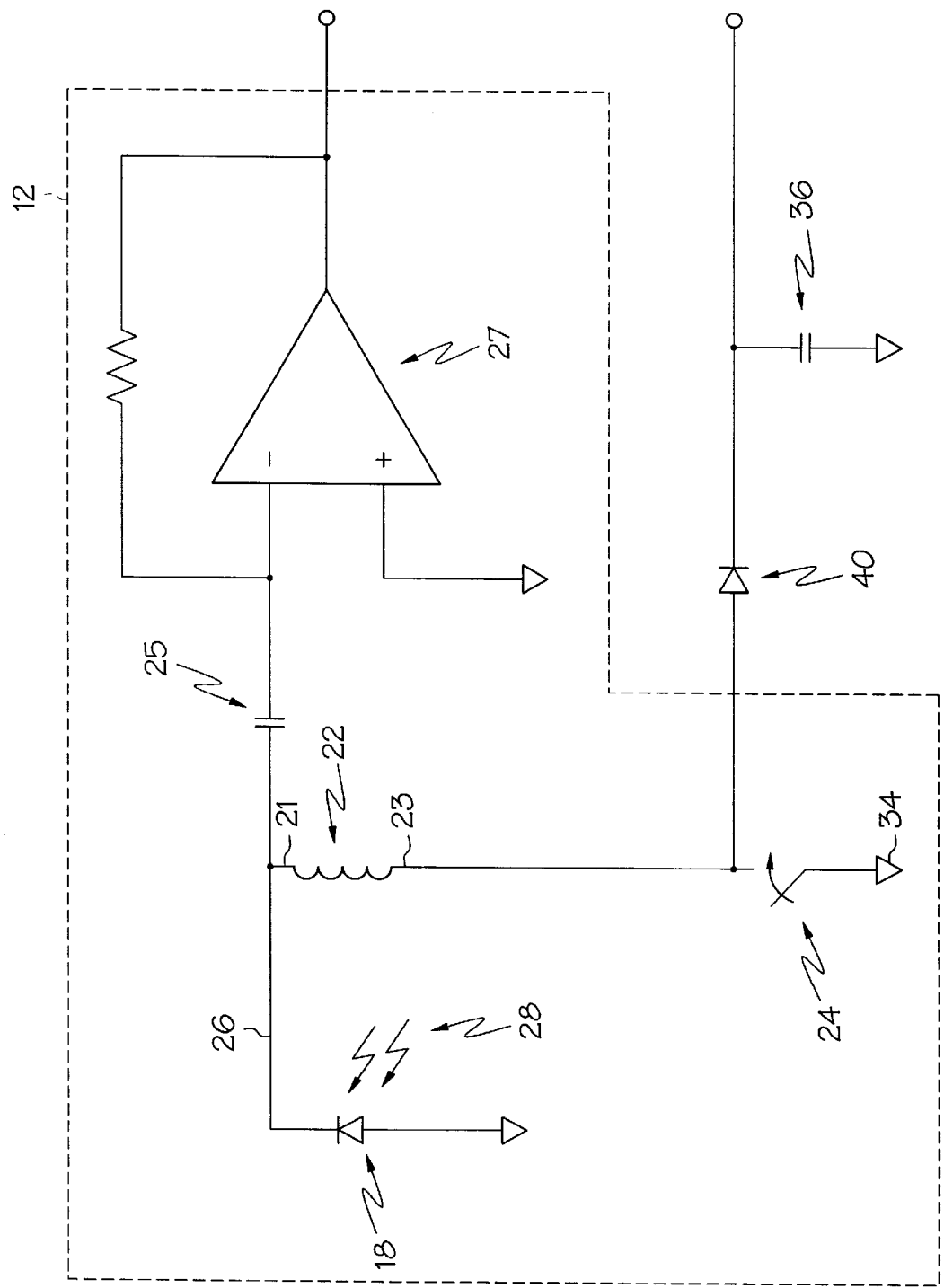
FIG. 3 is a schematic circuit diagram of a light receiver circuit of the present invention.

A laser receiver 10 according to the present invention is illustrated in FIGS. 1–3 and comprises a plurality of light receiver circuits 12, a controller/signal processor 14, and a charge storage circuit 16 functioning as a laser receiver power supply. Each light receiver circuit 12 includes at least one photoelectric cell 18, see FIGS. 2 and 3. As will be appreciated by those of ordinary skill in the art of laser beam reception, the resultant plurality of photoelectric cells 18 are typically arranged in an ordered array to enable the controller 14 to provide an output indicative of a position of a reference laser beam relative to the ordered array of photoelectric cells 18. To illustrate this aspect of the present invention, the light receiver circuits 12 are arranged in an ordered array in FIG. 1. FIG. 2 is a block diagram of the laser receiver 10 including a detailed illustration of one light receiver circuit 12. To preserve clarity, additional light receiver circuits 12 are not illustrated in FIG. 2. FIG. 3 includes a schematic circuit diagram of a single light receiver circuit 12 according to the present invention.

In the illustrated embodiment, each light receiver circuit 12 further comprises a signal amplifier 20, an inductor 22, and a switching circuit 24. Each photoelectric cell 18 defines a photoelectric cell output terminal 26 and is arranged to produce an incident light current signal at the output terminal 26 in response to light 28 incident upon the photoelectric cell 18. In most applications, the light 28 incident upon the photoelectric cell 18 will either comprise coherent light from a reference laser beam or ambient light. In one embodiment of the present invention, the photoelectric cell 18 comprises a photodiode and the inductor 22 comprises an electric coil.

The signal amplifier 20 is connected to the photoelectric cell output terminal 26 and is arranged to produce an amplified incident light signal at the amplifier output terminal 30. The signal amplifier 20 is preferably arranged to transform frequencies of interest to a voltage and to amplify that voltage. As will be appreciated by those skilled in the art of laser detection, the frequency values of interest will depend upon the characteristics of the laser light to be detected. Specifically, referring to FIG. 3, the signal amplifier 20 comprises a frequency filter capacitor 25 coupled to the input of an amplifier 27 operative to convert selected frequency current signals produced by the photoelectric cell 18 to a voltage signal and operative to amplify the voltage signal. In one embodiment of the present invention, the frequency filter capacitor 25 has a capacitance of approximately 1 $\mu$F and the signal amplifier 27 comprises a transimpedance amplifier.

The controller/signal processor 14 is connected to the signal amplifier 20 and is arranged to provide an output indicative of at least one characteristic of the incident light 28, as is described in further detail below. The inductor 22 defines an inductor input terminal 21 and an inductor output terminal 23. The inductor input terminal 21 is connected to the photoelectric cell output terminal 26. The charge storage circuit 16 is connected to the inductor output terminal 23.

The switching circuit 24, which is merely illustrated schematically in FIG. 3, is also connected to the inductor output terminal 23 and is operative to switch between a light detection state and a charge storage state. The light detection state causes a majority of current flowing through the inductor 22 to bypass the charge storage circuit 16. In contrast, the charge storage state causes a majority of current flowing through the inductor 22 to pass through the charge storage circuit 16. Specifically, the light detection state is characterized by connection of the inductor output terminal 23 to an electrical ground or a first electrical potential 34 lower than a potential generated by the incident light current signal. As is illustrated in FIG. 3, the first electrical potential 34 is typically an electrical ground or some other potential lower than a potential generated by the incident light current signal. In one embodiment of the present invention, the switching circuit 24 comprises a MOSFET device.

The charge storage state is typically more complex than the light detection state and employs a programmed switching circuit controller 32. For clarity of illustration, the switching circuit controller 32 is illustrated in FIG. 2 as forming a portion of the controller 14 since, typically, the controller 14 may be programmed to perform the functions of the switching circuit controller 32. However, it is contemplated by the present invention that the switching circuit controller 32 and the controller 14 may be distinct circuit elements within the laser receiver 10 of the present invention. The switching circuit controller 14 is programmed such that the charge storage state comprises two modes: (i) a first mode characterized by isolation of the inductor output terminal 23 from a first electrical potential 34 for a first duration; and (ii) a second mode characterized by connection of the inductor output terminal 23 to the first electrical potential 34 for a second duration. The switching circuit controller 32 is programmed such that the charge storage state is characterized by alternation, e.g., pulse width modulation, between the first mode and the second mode. The first duration and the second duration collectively form an alternation period characterized by a frequency of about 100 kHz.

The charge storage circuit 16 comprises a blocking diode 40, the charging capacitor 36, a voltage regulator 42, and a rechargeable power supply 44. The specific characteristics of the voltage regulator 42 and the rechargeable power supply 44 are dependent upon the particular design specifications of the laser receiver 10, including, for example, the number and type of photoelectric cells 18, the power requirements of the controller 14 and any peripheral display devices, and the intensity of the reference laser beam and the ambient light. Accordingly, the designation of many of the particular specifications of components of the laser receiver 10 is left to those of ordinary skill in the art of circuit design laser detection.

The respective magnitudes of the first and second durations are selected such that the first duration corresponds to a predetermined optimum charge time of a charging capacitor 36 within the charge storage circuit 16 and such that the second duration corresponds to a predetermined optimum discharge time of the charging capacitor 36. To ensure that the laser receiver 10 operates according to these optimum values, the switching circuit controller 32 is either programmed to (i) cause current to bypass intermittently the charge storage circuit 24 for a specific duration as a function of a predetermined alternation period frequency, as described above, or (ii) cause current to bypass intermittently the charge storage circuit 24 as a function of the amount of electrical charge stored in the charging capacitor 36. In one embodiment of the present invention, for example, it is contemplated that the inductance of the inductor can be approximately 1 mH, the capacitance of the charging capacitor 36 can be approximately 1 nF, the alternation period frequency can be approximately 100 kHz, the first duration, i.e., the charging duration, can be approximately 10 $\mu$sec, and the second duration, i.e., the discharging duration, can be approximately 90 $\mu$sec.

As is illustrated in FIG. 2, the controller 14 includes, or is at least in communication with, a signal processor 38 arranged to provide an output indicative of a position of a laser beam relative to the photoelectric cell 18. The signal processing techniques associated with this function of the laser receiver 10 are well known in the art and will not be described in detail herein. Reference is made to the disclosures of U.S. Pat. No. 5,000,564, issued to Ake on Mar. 19, 1991; U.S. Pat. No. 5,636,018, issued to Hirano et al. on Jun. 3, 1997; U.S. Pat. No. 4,820,041, issued to Davidson et al. on Apr. 11, 1989; U.S. Pat. No. 5,189,484, issued to Koschmann et al. on Feb. 23, 1993; and, U.S. Pat. No. 4,029,415, issued to Johnson et al. on Jun. 14, 1977, which are incorporated herein by reference. The controller 14 is preferably a programmable logic controller. However, it is contemplated by the present invention that, if it is the intent of those practicing the present invention to limit the operations of the laser receiver 10 to relatively basic functions, the controller may comprise a phase lock loop circuit employed to operate the switching circuit 24 so that it alternates between the charge storage state and the light detection state in an appropriate manner. Similarly, the signal processor 38 could comprise circuitry and a simple arrangement of indicator lights similar to those described in U.S. Pat. No. 4,676,634.

Figure 4:
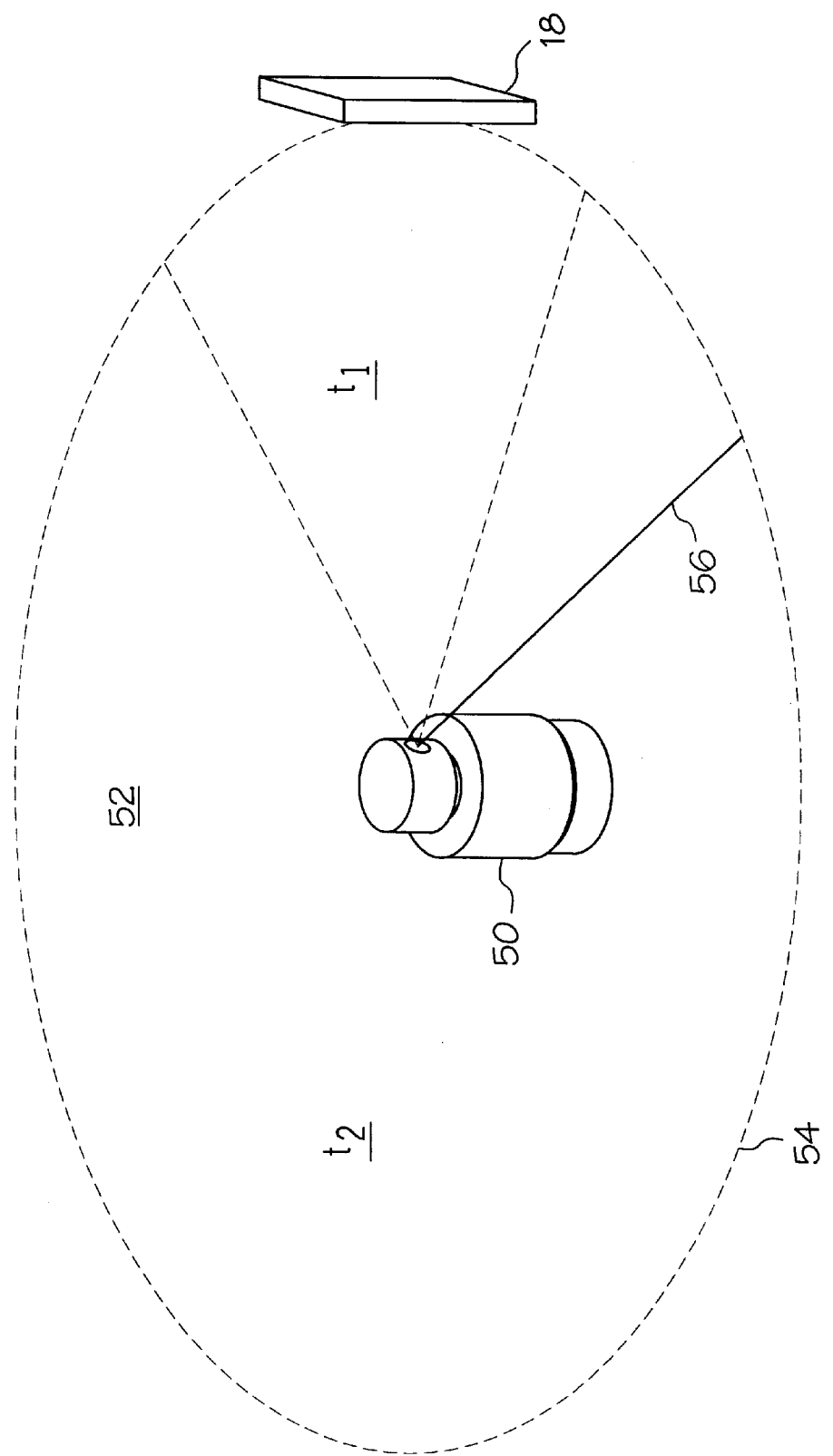
FIG. 4 is a schematic illustration of a laser transmitter/receiver system according to one embodiment of the present invention.

Referring now to FIG. 4, rotating laser transmitters commonly used in the field of the present invention to establish a reference plane of light 52. At least one photoelectric cell 18 is positioned in the path 54 of the rotating laser beam 56 to provide an indication of the position or, orientation of the reference plane of light 52. In this type of application, the controller 14 of the present invention is programmed to identify a sweep rate of the laser beam 56. The identified sweep rate defines a first period of time $t_1$ during which the laser beam 56 is in the vicinity of the photoelectric cell 18 and a second period of time $t_2$ during which the laser beam is remote from the photoelectric cell 18. The controller 14 is programmed to change the state of the switching circuit 24 to the light detection state during the first period of time $t_1$ and to the charge storage state during the second period of time $t_2$. Specifically, the sweep rate is used to determine the relative amounts of time during which the rotating laser beam 56 is near the photoelectric cell 18. When the laser beam 56 is near the photoelectric cell 18, e.g., for approximately 20% of a full sweep cycle, the controller 14, via the switching circuit controller 32, will cause the switching circuit 24 to operate in the light detection state described above. In contrast, when the laser beam 56 is not in the vicinity of the photoelectric cell 18, e.g., for approximately 80% of the full sweep cycle, the controller 14 will cause the switching circuit 24 to operate in the charge storage state described above.

Thus, in operation, current flow is established through the inductor 22 when the switching circuit 24 is controlled to couple the inductor 22 to the electrical ground 34. As a reference laser beam of interest sweeps through an arc remote from the photoelectric cell 18, the switching circuit 24 is operated in the first mode of the charge storage state, switch open, and current flows to the charge storage circuit 16 through the blocking diode 40 to the capacitor 36. The amount of current flow through the inductor 22 to the charge storage circuit 16 decreases as the charge on the capacitor 36 increases. Accordingly, at a predetermined point, the switching circuit 24 operates in the second mode of the charge storage state, switch closed, to reestablish current flow through the inductor 22. Operation in the charge storage state continues in this manner, i.e., alternating between the first and second modes at a predetermined cycle rate, until the reference laser beam of interest approaches the photoelectric cell 18 and the switching circuit 24 is changed to the light detection state.

In the light detection state, the photoelectric cell 18 generates a current signal having two components: a constant current component attributable to the ambient light incident upon the photoelectric cell 18; and, a second component attributable to a reference laser beam incident upon the photoelectric cell 18. The inductor 22, which is connected in parallel with the photoelectric cell 18, effectively strips off the constant current component. The signal amplifier 27, via the frequency filter capacitor 25, amplifies the frequencies of interest and outputs the amplified signal to the controller 14. Thus, the laser receiver 10 of the present invention utilizes a single set of photoelectric cells 18 and the switching circuit 24 to convert ambient solar energy to a recharging current and to convert an incident reference laser beam to a detection signal. Further, the laser receiver is designed so that the recharging function does not interfere with the light detection function.

Having described the invention in detail and by reference to preferred embodiments thereof, it will be apparent that modifications and variations are possible without departing from the scope of the invention defined in the appended claims.

What is claimed is:

1. A light receiver circuit comprising:
    a photoelectric cell defining a photoelectric cell output terminal and arranged to produce an incident light current signal in response to light incident upon said photoelectric cell;
    a signal amplifier connected to said photoelectric cell output terminal and arranged to produce an amplified incident light signal;
    a controller connected to said signal amplifier and arranged to provide an output indicative of at least one characteristic of said incident light;
    an inductor defining an inductor input terminal and an inductor output terminal, wherein said inductor input terminal is connected to said photoelectric cell output terminal;
    a charge storage circuit connected to said inductor output terminal; and
    a switching circuit connected to said inductor output terminal and operative to switch between a light detection state and a charge storage state, wherein said light detection state causes a majority of current flowing through said inductor to bypass said charge storage circuit, and wherein said charge storage state causes a majority of current flowing through said inductor to pass through said charge storage circuit.

2. A light receiver circuit as claimed in claim 1 wherein said light detection state is characterized by connection of said inductor output terminal to a first electrical potential lower than a potential generated by said incident light current signal.

3. A light receiver circuit as claimed in claim 2 wherein said first electrical potential comprises an electrical ground.

4. A light receiver circuit as claimed in claim 1 wherein said charge storage circuit comprises a blocking diode, a charging capacitor, a voltage regulator, and a rechargeable power supply.

5. A light receiver circuit as claimed in claim 1 wherein said controller comprises a switching circuit controller programmed such that said charge storage state is characterized by alternation between:
    a first mode characterized by isolation of said inductor output terminal from a first electrical potential for a first duration, wherein said first electrical potential is lower than a potential generated by said incident light current signal; and
    a second mode characterized by connection of said inductor output terminal to said first electrical potential for a second duration.

6. A light receiver circuit as claimed in claim 5 wherein said first duration and said second duration collectively form an alternation period, and wherein said alternation period is characterized by a frequency of about 100 kHz.

7. A light receiver circuit as claimed in claim 5 wherein said first duration corresponds to a predetermined optimum charge time of a charging capacitor within said charge storage circuit and said second duration corresponds to a predetermined optimum discharge time of said charging capacitor.

8. A light receiver circuit as claimed in claim 1 wherein said controller comprises a switching circuit controller programmed to cause current to bypass intermittently said charge storage circuit as a function of a predetermined alternation period frequency.

9. A light receiver circuit as claimed in claim 1 wherein said charge storage circuit comprises a charging capacitor and wherein said controller comprises a switching circuit controller programmed to cause current to bypass intermittently said charge storage circuit as a function of the amount of electrical charge stored in said charging capacitor.

10. A light receiver circuit as claimed in claim 1 wherein said controller includes a signal processor arranged to provide an output indicative of a position of a laser beam relative to said photoelectric cell.

11. A light receiver circuit as claimed in claim 1 wherein said controller is programmed to identify a sweep rate of a laser beam incident upon said photoelectric cell, wherein said sweep rate defines a first period of time during which said laser beam is in the vicinity of said photoelectric cell and a second period of time during which said laser beam is remote from said photoelectric cell, and wherein said controller is programmed to change the state of said switching circuit as a function of said first and second periods of time.

12. A light receiver circuit as claimed in claim 1 wherein said switching circuit is changed to said light detection state during said first period of time and to said charge storage state during said second period of time.

13. A light receiver circuit as claimed in claim 1 wherein said controller comprises a signal processor and a switching circuit controller.

14. A light receiver circuit as claimed in claim 1 wherein said switching circuit comprises a MOSFET device.

15. A light receiver circuit as claimed in claim 1 wherein said photoelectric cell comprises a photodiode.

16. A light receiver circuit as claimed in claim 1 wherein said signal amplifier comprises a frequency filter capacitor coupled to the input of an amplifier operative to convert selected frequency current signals produced by said photoelectric cell to a voltage signal and amplify said voltage signal.

17. A light receiver circuit as claimed in claim 16 wherein said frequency filter capacitor has a capacitance of approximately 1 $\mu$F.

18. A light receiver circuit as claimed in claim 1 wherein said inductor comprises an electrical coil.

19. A light receiver circuit as claimed in claim 1 wherein said inductor is connected in parallel with said photoelectric cell.

20. A light receiver circuit as claimed in claim 1 wherein said inductor has an inductance of between approximately 0.1 mH and approximately 10 mH.

21. A laser receiver comprising:
a plurality of photoelectric cells defining respective photoelectric cell output terminals and arranged to produce respective incident laser beam signals in response to a laser beam incident upon said plurality of photoelectric cells;
respective signal amplifiers connected to each of said photoelectric cell output terminals and arranged to produce respective amplified incident laser beam signals;
a controller connected to said respective signal amplifiers and arranged to provide an output indicative of at least one characteristic of said incident laser beam;
a plurality of inductors defining respective inductor input terminals and respective inductor output terminals, wherein each of said inductor input terminals is connected to one of said photoelectric cell output terminals;
a charge storage circuit connected to said inductor output terminals; and
a switching circuit connected to said inductor output terminals and operative to switch between a light detection state and a charge storage state, wherein said light detection state causes a majority of current flowing through each of said plurality of inductors to bypass said charge storage circuit, and wherein said charge storage state causes a majority of current flowing through each of said plurality of inductors to pass through said charge storage circuit.

22. A laser receiver as claimed in claim 21 wherein said plurality of photoelectric cells are arranged in an ordered array and wherein said controller is arranged to provide an output indicative of a position of said laser beam relative to said plurality of photoelectric cells.

23. A method of powering a light receiver circuit comprising the steps of:
providing a photoelectric cell defining a photoelectric cell output terminal, said photoelectric cell being arranged to produce an incident light current signal in response to light incident upon said photoelectric cell;
connecting a signal amplifier to said photoelectric cell output terminal, said signal amplifier being arranged to produce an amplified incident light signal;
connecting a controller to said signal amplifier, said controller being arranged to provide an output indicative of at least one characteristic of said incident light;
providing an inductor defining an inductor input terminal and an inductor output terminal;
connecting said inductor input terminal to said photoelectric cell output terminal;
connecting a charge storage circuit to said inductor output terminal;
switching a switching circuit between a light detection state which causes a majority of current flowing through said inductor to bypass said charge storage circuit, and a charge storage state which causes a majority of current flowing through said inductor to pass through said charge storage circuit.

24. A method of powering a light receiver circuit as claimed in claim 23 wherein, upon switching said switching circuit to said charge storage state, said method further comprises the steps of:
operating in a first mode characterized by isolation of said inductor output terminal from a first electrical potential for a first duration, wherein said first electrical potential is lower than a potential generated by said incident light current signal;
operating in a second mode characterized by connection of said inductor output terminal to said first electrical potential for a second duration; and
alternating between said first mode and said second mode such that said first duration and said second duration collectively form an alternation period.

25. A method of powering a light receiver circuit as claimed in claim 24 further comprising the steps of:
identifying a sweep rate of a laser beam incident upon said photoelectric cell, wherein said sweep rate defines a first period of time during which said laser beam is in the vicinity of said photoelectric cell and a second period of time during which said laser beam is remote from said photoelectric cell; and
changing the state of said switching circuit to said light detection state during said first period of time and to said charge storage state during said second period of time.

* * * * *